Oct. 15, 1929.  G. W. HELSEL  1,732,127
FRUIT GATHERER
Filed Sept. 19, 1927   2 Sheets-Sheet 1
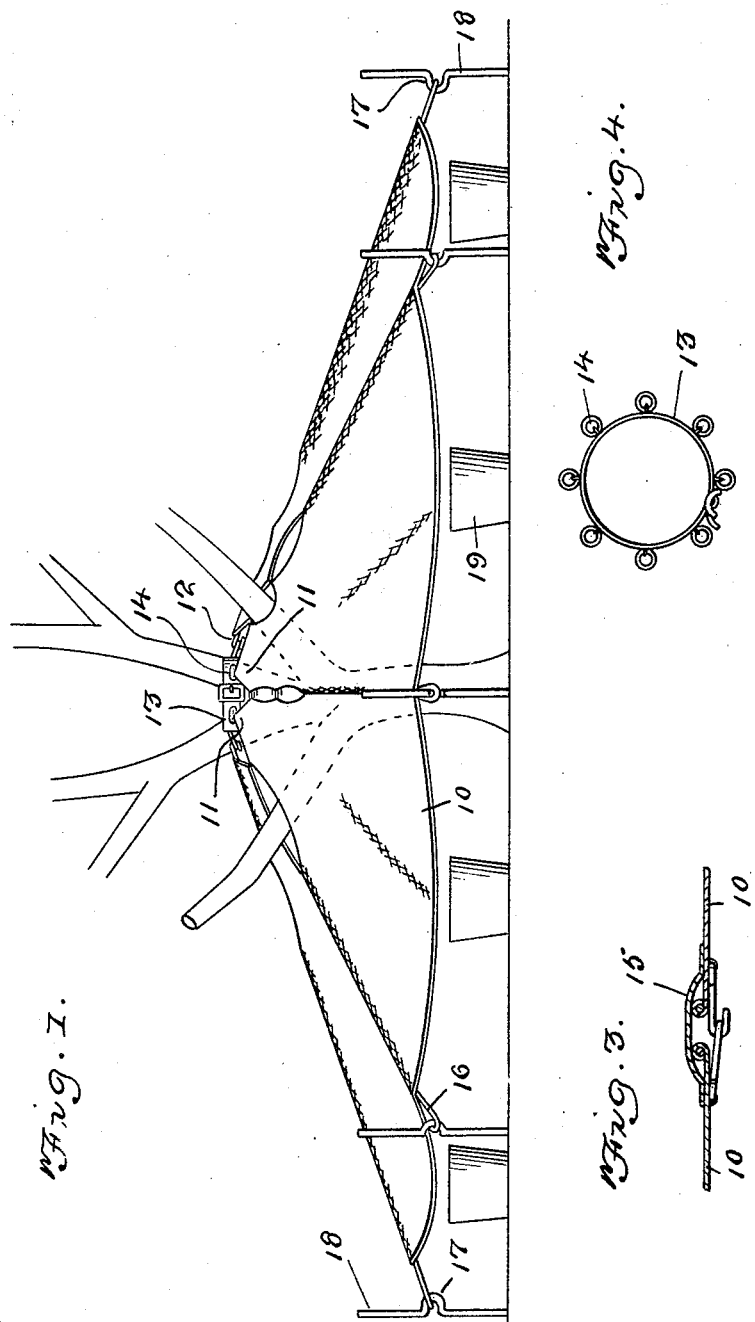
G. W. Helsel
INVENTOR
BY Victor J. Evans
ATTORNEY
WITNESS:

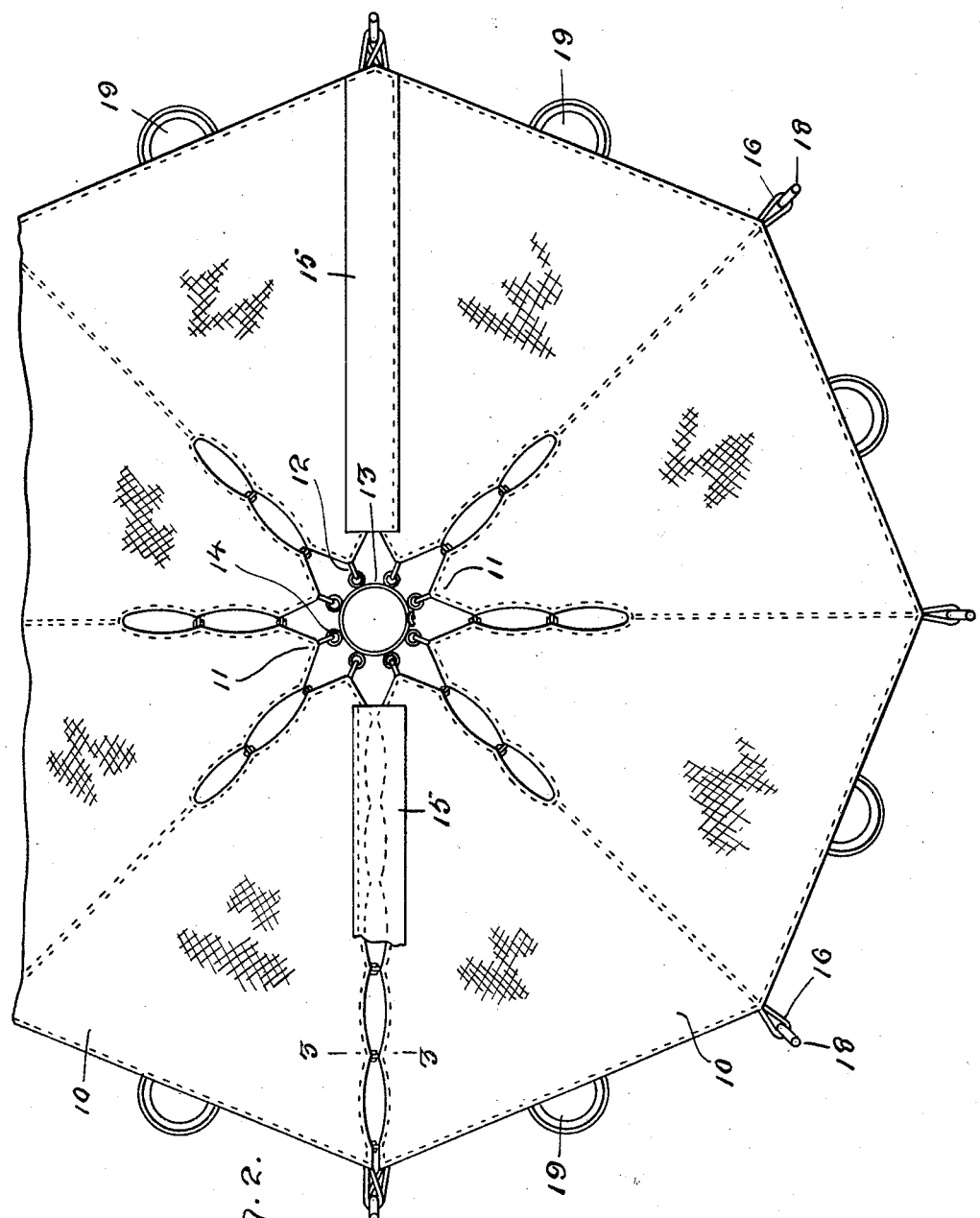

Patented Oct. 15, 1929

1,732,127

UNITED STATES PATENT OFFICE

GEORGE W. HELSEL, OF COLUMBUS, OHIO

FRUIT GATHERER

Application filed September 19, 1927. Serial No. 220,603.

This invention has particular relation to fruit gatherers adapted for use beneath trees to catch and deposit falling fruit.

An object of the invention comprehends a covering adapted for connection with the trunks and limbs of trees and to be spread for appreciable distances beneath the branches to break the fall of the fruit and to prevent bruising.

Another object of the invention contemplates sections for the covering adapted to sag toward the centers thereof to direct the falling fruit within the channels defined whereby the fruit may be conveniently deposited within receptacles located adjacent the mouths of the channels.

A further object of the invention consists of supporting members adapted to elevate the sections appreciable distances above the receptacles.

More specifically stated the sections are adapted for detachable engagement for application upon trees of different sizes and which are closed at the intersections thereof to prevent fruit from passing therebetween.

With the above and other objects in view, the invention further consists of the following novel features and details of construction, to be hereinafter more fully described, illustrated in the accompanying drawings and pointed out in the appended claim.

In the drawings:—

Figure 1 is an elevation of the invention while in use.

Figure 2 is a top plan view thereof.

Figure 3 is a detail sectional view taken on line 3—3 of Figure 2.

Figure 4 is a top plan view of the connecting means for the sections for application upon a tree trunk.

The gatherer, as mentioned in the foregoing, is in the nature of a covering and which consists of a plurality of sector-shaped sections 10. Said sections are extended radially from a common center and having the meeting edges thereof connected in any suitable manner.

As shown in Figure 2 of the drawings, the sections are adapted to provide semi-circular coverings; the adjacent side edges of the respective semi-circular coverings being joined by hook and eye connections, such as illustrated in Figure 3 of the drawings. The apices of the sectors are abruptly tapered to provide vertices 11. Hooks 12 are extended from each of the vertices. An adjustable band 13 having eyes 14 upon the outer circumference thereof are adapted for connection with the hooks 12. Said band is adapted to encircle a tree trunk or its branches or limbs in the manner as best illustrated in Figure 1 of the drawings. The side edges of the sectors 10, other than the meeting sectors of the semi-circular coverings, are provided with the hook and eye connections to provide openings therebetween through which branches and limbs may be extended. The line of openings defined at the points of connection between the respective semi-circular cover sections are normally closed by strips 15 to prevent loss of fruit passing therethrough.

Loops 16 extended from the bases of each of the sectors are adapted for connection with open looped portions 17 provided at appropriate points in the lengths of standards 18 to elevate such portions of the sectors at suitable heights above the ground. It will thus be noted that the tension of the loops 16 at the bases of the sectors will cause the central portions thereof to sag longitudinally whereby fruit falling upon the covering will be directed toward the sagging portions and subsequently directed and deposited within receptacles 19 located at the mouths of the sag portions.

It will thus be noted from the foregoing description and accompanying drawings that the sectors may be easily folded upon themselves at the points of connection to compactly store the entire device within confined area and in such condition the same may be conveniently carried from one tree to another.

By reason of the fact that the sectors may be detachably connected, the invention may be employed upon trees of any girth by adding or diminishing the number of sectors. The arrangement of the sectors and the sagging arrangement thereof will break the fall of falling fruit to prevent bruising and which will not cause the same to rebound by reason of the fact that the sections are hung loosely to sag whereby the fruit may be conveniently deposited in the receptacle.

The invention is susceptible of various changes in its form, proportions and minor details of construction, and the right is herein reserved to make such changes as properly fall within the scope of the appended claim.

Having thus described the invention, what is claimed is:—

A fruit gatherer comprising a covering composed of semi-circular portions, each portion being formed of a plurality of sector-shaped sections, means for connecting the adjacent portions of the semi-circular portions, the apices of the sections being oppositely beveled to abruptly form vertices, hooks carried by the vertices, an adjustable band adapted for connection with a tree being provided with rings for connection with said hooks, the sections being adapted to sag axially of the longitudinal centers thereof, and strips carried by the semi-circular portions adjacent the meeting sides thereof to close the openings therebetween.

In testimony whereof I affix my signature.

GEORGE W. HELSEL.